Nov. 6, 1923.
W. H. WENHOLZ
TRUCK AND WAGON DUMP
Filed July 7, 1921
1,473,531
3 Sheets-Sheet 3
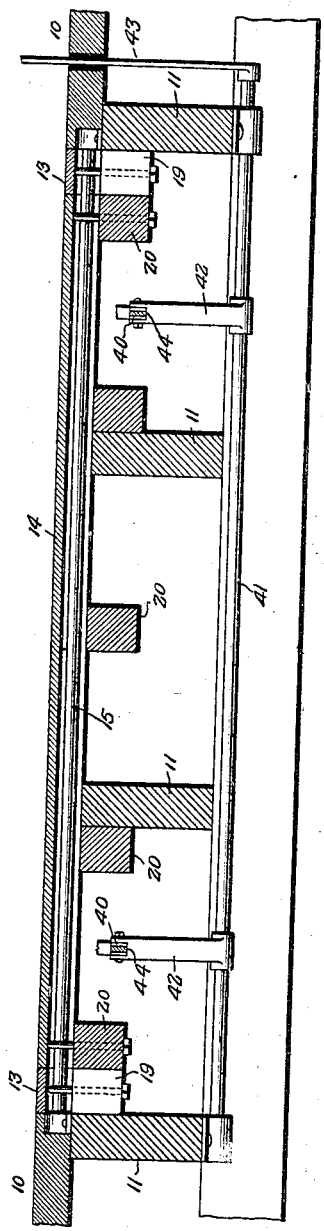
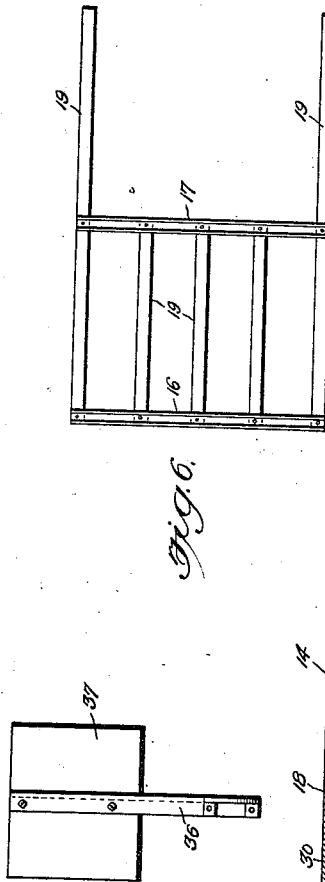
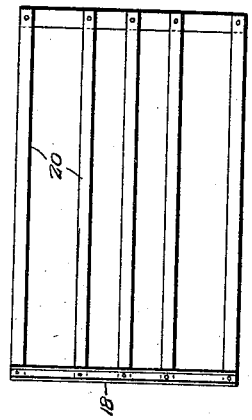
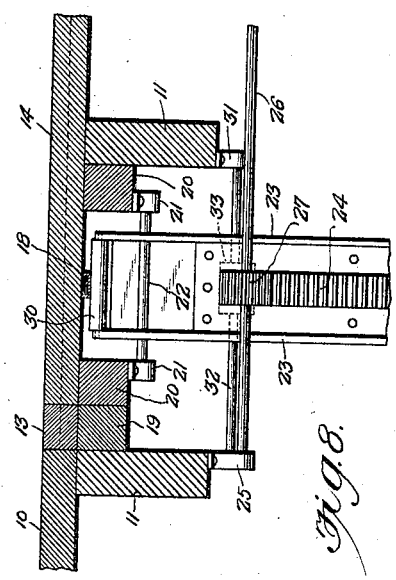
W. H. Wenholz,
INVENTOR.
BY
Geo. P. Kimmel
ATTORNEY.

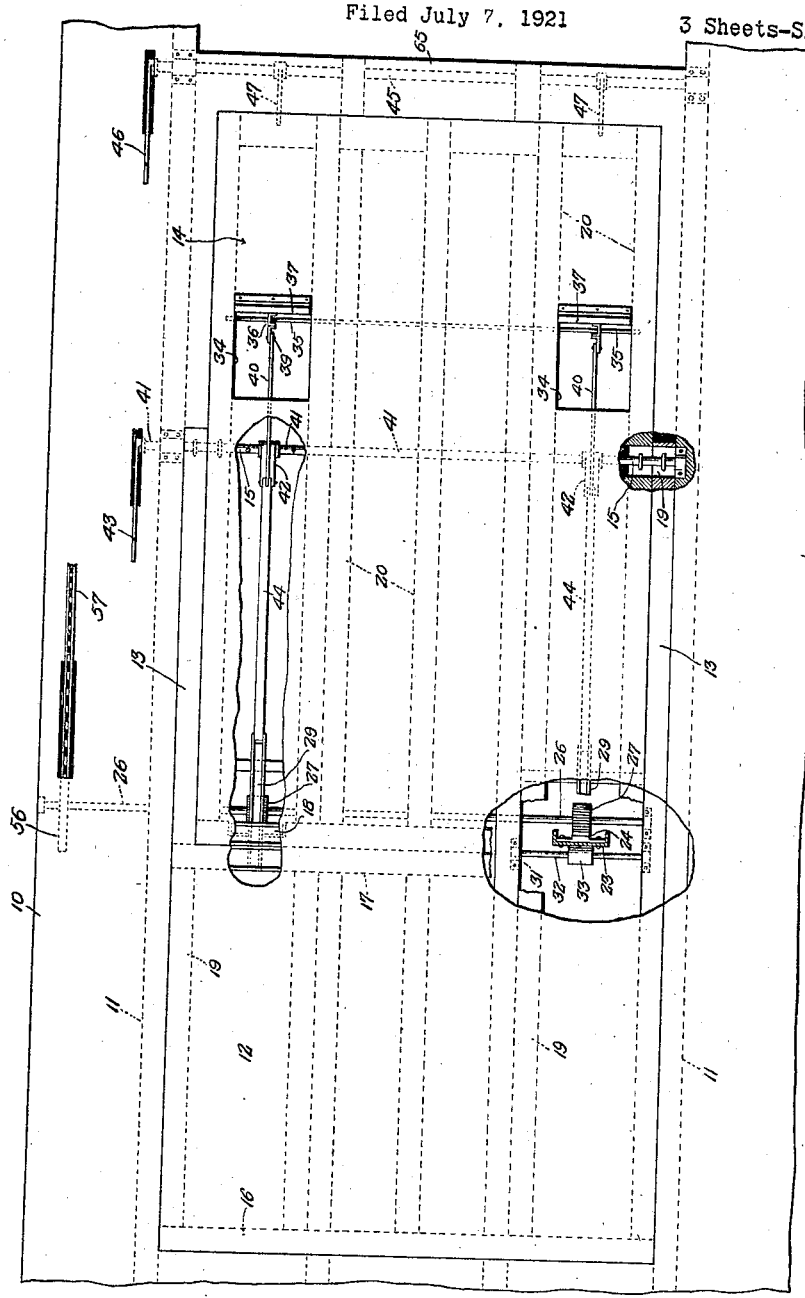

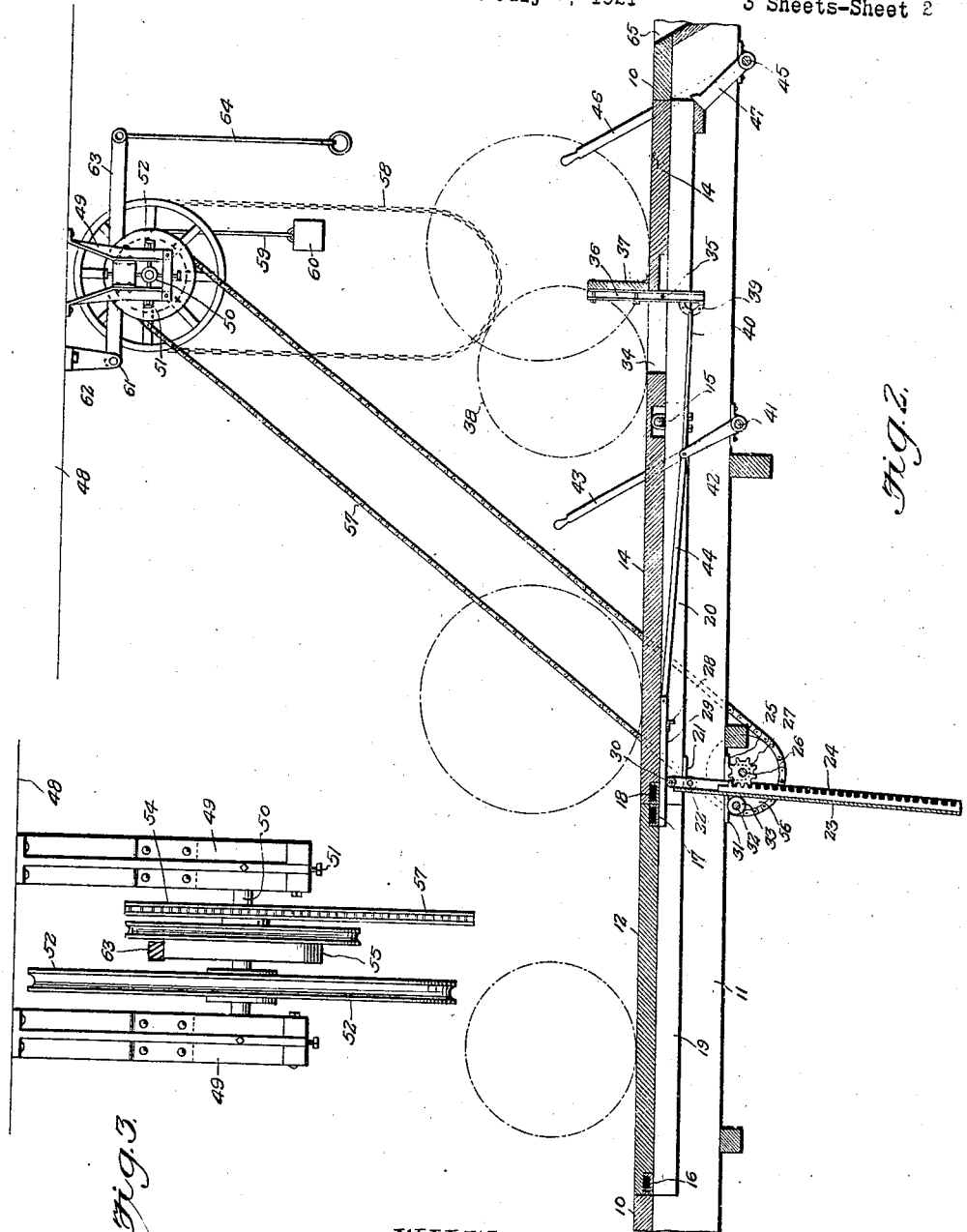

Patented Nov. 6, 1923.

1,473,531

UNITED STATES PATENT OFFICE.

WILLIAM H. WENHOLZ, OF HUTCHINSON, KANSAS.

TRUCK AND WAGON DUMP.

Application filed July 7, 1921. Serial No. 482,975.

*To all whom it may concern:*

Be it known that I, WILLIAM H. WENHOLZ, a citizen of the United States, residing at Hutchinson, in the county of Reno and State of Kansas, have invented certain new and useful Improvements in a Truck and Wagon Dump, of which the following is a specification.

This invention relates to combined wagon and truck dumping apparatus, and has for one of its objects to produce a device of this character adapted to receive and dump wagons having relatively short wheel bases or motor trucks having relatively long wheel bases, without structural change in the parts.

Another object of the invention is to provide a device of this character having a relatively long platform, a relatively short platform mounted for simultaneous or independent swinging movement or for movement in unison.

With these and other objects in view the invention consists in certain novel features of construction as hereinafter shown and described and then specifically pointed out in the claims, and in the drawings illustrative of the preferred embodiment of the invention:—

Figure 1, is a plan view of the improved apparatus, with parts broken away to show the construction of certain parts.

Fig. 2 is a longitudinal sectional elevation.

Fig. 3 is an enlarged end elevation of the platform actuating mechanism.

Fig. 4 is an enlarged sectional detail of the cooperating platforms.

Fig. 5 is an enlarged detail of one of the stop elements for an auto truck.

Fig. 6 is a plan view on a reduced scale of the supporting frame of the outer platform.

Fig. 7 is a plan view on a reduced scale of the supporting frame of the inner platform.

Fig. 8 is a sectional detail of the same scale as Fig. 4, illustrating the construction and operation of the platform elevating mechanism.

The improved apparatus comprises in general an outer relatively long platform formed with a head portion and spaced side portions extending from the head portion, and a relatively short inner platform disposed between the spaced side portion of the outer platform, the two platforms being mounted to swing on a common pivotal means. Operative means are coupled to the inner and shorter platform, and means provided for locking the two platforms to swing in unison.

The shorter platform is designed to receive wagons and other vehicles having a relatively short wheel base, while the longer platform provides for vehicle such as auto trucks and the like having relatively long wheel bases.

The improved apparatus may be installed in connection with grain elevators, warehouses, shipping platforms, and other places where products in bulk are to be discharged. For the purpose of illustration the improved apparatus is shown erected in an opening in the floor 10 of a building such as an elevator, or the like, the floor timbers being indicated at 11.

The outer platform comprises a head portion represented as a whole at 12 and the spaced side portions at 13, extending from the head, as shown in Fig. 1. The outer platform is thus in U-shape with the head portion 12 relatively long.

The inner platform represented as a whole at 14 is oblong in outline and fits between the side portions 13 and against the head portion 13 of the outer platform.

A shaft 15 is supported in the floor timbers 11 at the sides of the opening in the floor 10, and the outer platform portions 13 and the inner platform 14 are all mounted to swing on or with the shaft and in unison or independently as may be required.

The head portion 12 and the spaced side portions 13 which constitute the outer platform, are preferably formed with two thicknesses of planking, the head portion 12 being reinforced by transverse channel bars 16 and 17, while the inner platform is likewise preferably formed of two thicknesses of planking reinforced by a transverse channel bar 18. The head member 12 is likewise further reinforced by longitudinally directed members 19, and the inner platform is further reinforced by longitudinally directed members 20.

Attached to the under faces of certain of the supporting members 20 at each side of the inner platform, are hanger device 21 which support a short shaft 22 and upon which bars 23, preferably of channel metal, are mounted to swing near their upper ends.

Each of the bars 23 is supplied with a rack bar 24, as shown.

Mounted in hangers 25 from the lower faces of the floor supports or joists 11 at the sides of the opening in the floor 10, is an operating shaft 26, and mounted on the shaft are pinions 27 in constant engagement with the rack bars 24.

Slidably supported by carrier devices or keepers 28 are lock bars 29 adapted to be projected at one end beneath the stay member 17, as shown in Fig. 2, to lock the inner platform to the outer platform to enable them to move in unison.

At their upper ends the bars 23 are each provided with a bearing roller 30 to respectively engage the under faces of the lock bars 29 and not only assist in holding the latter in position but likewise prevent cramping when the rack bars are actuated.

Attached to the under faces of the same floor members 11 to which the hangers 25 are attached, are other hangers 31 supporting short shafts 32, each of said shafts carrying a bearing roller 33 to hold the bars 23 and racks 24 in operative position relative to the pinions 27.

Openings 34 are formed in the floor of the inner platform and spaced to correspond to the transverse distance between the wheels of the truck or wagon to be dumped. Mounted to swing at 35 in the openings 34, are bars 36 each carrying a stop plate 37 which fill the openings when in one position, and constitutes buffers to hold the rear wheels indicated at 38, of a truck while being tilted for dumping.

Attached to each of the bars 37 is a plate 39 preferably in a half circle and to each of which a rod 40 is pivoted.

Mounted for oscillation upon certain of the floor members 11 is a shaft member 41, and attached to the shaft are arms 42, one for each of the rods 40, and also attached to the shaft 41 is an operating lever 43. The arms 42 are coupled at their outer ends to the rods 40 and also connected respectively to the lock bars 29 by rods 44.

By this arrangement it will be obvious that when the lever 43 is disposed in one position, for instance as shown in Fig. 2, the buffers or stops 37 will be disposed in vertical position and the lock bars 29 moved beneath the member 17 and lock the platforms to move in unison when the rack members 24 are operated.

Then when the position of the lever 43 is reversed, the buffer members 37 will be disposed within the openings 34 with their upper faces flush with the floor of the inner platform, and the lock bars withdrawn from beneath the member 17, so that when the rack members 24 are again actuated, the inner platform only will be operated, leaving the outer platform in horizontal position.

Mounted for rotation beneath the floor timbers 11 in advance of the downwardly tilting end of the inner platform is another shaft 45 carrying an operating lever 46 and one or more stop arms 47 adapted to engage beneath the adjacent end of the inner platform, as shown in Fig. 2, to prevent tilting movement of the latter when the lever 46 is in one position, and to release the inner platform and permit it to tilt when the position of the lever is reversed.

Suspended from any suitable support, for instance the ceiling timbers of the room in which the device is erected, and indicated at 48, are hanger devices represented as a whole at 49 and supporting a shaft 50, the position of the shaft being controlled by adjusting screws 51.

Mounted for rotation with the shaft 50 is a relatively large grooved cable wheel 52, a relatively small grooved cable wheel 53, a chain wheel 54, and a brake drum 55.

Mounted on the extended end of the shaft 26 is a chain wheel 56 in alinement with the chain wheel 54 on the shaft 50 and an endless chain 57 engage over the chain wheels, as shown.

An endless pull cable 58 engages over the larger grooved wheel 52, while a cable 59 is attached to the smaller grooved wheel 53 and is provided with a counter weight 60.

Pivoted at 61 to a hanger 62 attached to the support 48 is a brake lever 63 engaging the drum 55 and operative in any suitable manner, for instance by a pull rod 64. By this means the movement of the platforms can be controlled.

A portion of the receiving hopper is indicated at 65.

If the vehicle to be dumped is an ordinary horse drawn wagon having a relatively short wheel base, the buffer elements 37 are disposed in their lower position or within the openings 34 by actuating the lever 43, so that no part projects above the line of the floor portions 12—13 and 14, the lock member 29 being also withdrawn from beneath the portion 12 of the outer platform by the same movement of the lever, leaving the inner platform free to be tilted independently of the outer platform.

Care should be taken to see that the lever 46 is actuated to dispose the arms 47 in position to hold the platforms from premature tilting.

The vehicle is then driven or backed upon the platforms until the rear wheels, one of which is indicated by dotted lines at 66, are located adjacent to the portion of the floor 10 between the receiving hopper 65 and the downwardly tilting end of the inner platform. The lever 46 is then operated to release the arms 47 so that when the shaft 26 is rotated, for instance, by actuating the pull cable or chain 58, the inner platform will be tilted by the coaction of the pinion 27 and rack bar 24, and cause the rear wheels 66 to engage the section of floor 10 at the tilting end of the platform, the floor section thus serving as a stop or buffer to hold the vehicle while its load is being discharged into the hopper 65.

It will be obvious that the inclination of the vehicle may be easily controlled by actuating the brake device 63—55, by a pulling force applied to the rod 64.

After the discharging operation the shorter platform may be restored to its level position by reversing the motion of the pull member 58 and "easing" or checking the return movement by operating the brake device.

If the load to be discharged is carried by a motor driven truck having a relatively long wheel base, the lever 46 is retained in position to hold the arms 47 in locking engagement with the inner platform, but the lever 43 is actuated to elevate the buffer member 37 into the position shown in Fig. 2 and at the same time project the lock bars 29 beneath the member 17 of the outer platform to lock the two platforms to move in unison. The loaded truck is then disposed on the coupled platforms with the rear wheels, one of which is indicated at 38, in engagement with the buffer or stop 37, which will hold it from rear movement when the coupled platforms are tilted. The lever 46 is then actuated to release the arms 47 and the endless cable 58 actuated as before described, to cause the rack bars to elevate the coupled platforms to dispose the truck in position to discharge its load into the hopper 65, in the same manner as heretofore described for the shorter horse drawn vehicle.

The rear overhang of motor driven trucks is greater than the rear overhang of horse-drawn vehicles, which is the reason that the buffer member 37 is disposed relatively near the shaft 15.

The preferred embodiment of the invention is disclosed in the drawings and set forth in the specification, but it will be understood that modifications within the scope of the claim may be made in the construction without departing from the principle of the invention or sacrificing any of its advantages.

What is claimed is:—

In an apparatus of the class described, an outer platform, an inner platform, a movable stop device carried by said inner platform, means for locking said inner platform to the outer platform and means for simultaneously actuating said stop device and lock device.

In testimony whereof, I affix my signature hereto.

WILLIAM H. WENHOLZ.